US012215835B2

(12) United States Patent
Morimoto et al.

(10) Patent No.: US 12,215,835 B2
(45) Date of Patent: Feb. 4, 2025

(54) HEADLIGHT MODULE AND HEADLIGHT DEVICE

(71) Applicant: Mitsubishi Electric Corporation, Tokyo (JP)

(72) Inventors: Tomohide Morimoto, Tokyo (JP); Masashige Suwa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/286,368

(22) PCT Filed: Apr. 22, 2021

(86) PCT No.: PCT/JP2021/016311
§ 371 (c)(1),
(2) Date: Oct. 11, 2023

(87) PCT Pub. No.: WO2022/224408
PCT Pub. Date: Oct. 27, 2022

(65) Prior Publication Data
US 2024/0200745 A1 Jun. 20, 2024

(51) Int. Cl.
*F21S 41/365* (2018.01)
*F21S 41/148* (2018.01)
*F21W 102/135* (2018.01)

(52) U.S. Cl.
CPC .......... *F21S 41/365* (2018.01); *F21S 41/148* (2018.01); *F21W 2102/135* (2018.01)

(58) Field of Classification Search
CPC ...... F21S 41/365; F21S 41/148; F21S 41/321; F21S 41/24; F21S 41/322; F21S 41/36; F21W 2102/135
See application file for complete search history.

(56) References Cited

U.S. PATENT DOCUMENTS 1,533,615 A * 4/1925 Schwartz ................ F21S 41/32 362/277
2008/0225540 A1 9/2008 Tsukamoto et al.
(Continued)

FOREIGN PATENT DOCUMENTS

CN 202140942 U * 2/2012
JP 2008-091349 A 4/2008
(Continued)

OTHER PUBLICATIONS

Search English translation of KR-20190080506-A (Year: 2019).*
(Continued)

*Primary Examiner* — Omar Rojas Cadima
(74) *Attorney, Agent, or Firm* — XSENSUS LLP

(57) ABSTRACT

A headlight module includes a light source to emit light; and a light guide projection optical element including an incidence surface to condense the light, thereby forming a first light, a first reflecting surface to reflect partial light as part of the first light, thereby forming light in a first light distribution pattern having a cutoff line from light other than the partial light, and a second reflecting surface inclined with respect to an optical axis of the light source so as to be farther from the optical axis as a distance from the light source along the optical axis increases. The second reflecting surface forms light in a second light distribution pattern by reflecting second light formed of the partial light reflected by the first reflecting surface and adds the light in the second light distribution pattern to the light in the first light distribution pattern.

16 Claims, 10 Drawing Sheets

(56) References Cited

U.S. PATENT DOCUMENTS

| | | | | |
|---|---|---|---|---|
| 2012/0147618 | A1* | 6/2012 | Sato | B60Q 1/1415 362/517 |
| 2016/0053967 | A1 | 2/2016 | Owada | |
| 2021/0325017 | A1 | 10/2021 | Iwasaki | |

FOREIGN PATENT DOCUMENTS

| | | | | |
|---|---|---|---|---|
| JP | 2008-226788 | A | | 9/2008 |
| JP | 2010-123301 | A | | 6/2010 |
| JP | 2012-129002 | A | | 7/2012 |
| JP | 2015-130293 | A | | 7/2015 |
| JP | 2016-046129 | A | | 4/2016 |
| JP | 2020-035702 | A | | 3/2020 |
| KR | 20190080506 | A | * | 7/2019 |

OTHER PUBLICATIONS

Search English translation of CN-202140942-U (Year: 2012).*
International Search Report and Written Opinion mailed on May 25, 2021, received for PCT Application PCT/JP2021/016311, filed on Apr. 22, 2021, 9 pages including English Translation.

* cited by examiner

HEADLIGHT MODULE AND HEADLIGHT DEVICE

CROSS-REFERENCE TO RELATED APPLICATION

This application is based on PCT filing PCT/JP2021/016311, filed Apr. 22, 2021, the entire contents of which are incorporated herein by reference.

TECHNICAL FIELD

The present disclosure relates to a headlight module and a headlight device including the headlight module.

BACKGROUND ART

A headlight device for a vehicle needs to satisfy a prescribed light distribution pattern stipulated by road traffic rules or the like. The "light distribution" means luminosity distribution of a light source with respect to a space. That is, the light distribution is spatial distribution of light emitted from the light source. Further, the "luminosity" represents the level of intensity of light emitted by an illuminant. The luminosity is a value obtained by dividing luminous flux flowing in a minute solid angle in a certain direction by the solid angle.

The light distribution pattern stipulated in the road traffic rules in regard to the low beam for an automobile is in a horizontally long shape that is narrow in the upward/downward direction. Further, so as not to dazzle the drivers of oncoming vehicles, a cutoff line as a boundary line at the top of the light distribution pattern is required to be distinct. That is, it is required that a region above the cutoff line (i.e., outside the light distribution pattern) is dark and a region below the cutoff line (i.e., inside the light distribution pattern) is bright, that is, the cutoff line is distinct.

Here, the "cutoff line" means a separator line regarding brightness/darkness of light that is formed when the light emitted from the headlight device is applied to a wall or a screen, that is, a separator line at the top of the light distribution pattern. That is, the "cutoff line" is a light brightness/darkness boundary line at the top of the light distribution pattern. Put another way, the cutoff line is a boundary line between an upper region inside the light distribution pattern where the light is bright and a region outside the light distribution pattern where the light is dark. The cutoff line is a term that is used for explaining a function of adjusting an emission direction of the light emitted from the headlight device when vehicles pass by each other. The light emitted from the "headlight device for passing by" is referred to also as the aforementioned "low beam".

Further, it is required that a region below the cutoff line (i.e., a region inside the light distribution pattern and slightly below the cutoff line) is a region of the maximum illuminance. This maximum illuminance region is referred to as a "high illuminance region". Here, the "region below the cutoff line" means the upper region inside the light distribution pattern and corresponds to a part of the headlight device for illuminating far positions. In order to realize such a distinct cutoff line, major chromatic aberration, blurring or the like should never occur to the cutoff line. The "occurrence of blurring to the cutoff line" means that the cutoff line becomes unclear.

In order to implement such a cutoff line, there has been known a configuration in which part of the light emitted from the light source is blocked by covering the light source with a light blocking member such as a shade. See Patent Reference 1, for example.

PRIOR ART REFERENCE

Patent Reference

Patent Reference 1: Japanese Patent Application Publication No. 2015-130293.

SUMMARY OF THE INVENTION

Problem to be Solved by the Invention

However, in the configuration of the Patent Reference 1, there is a problem in that utilization efficiency of light (hereinafter referred to also as "light utilization efficiency") deteriorates. That is, part of the light emitted from the light source is blocked by the shade and is not used as illuminating light.

An object of the present disclosure is to provide a headlight module and a headlight device having high light utilization efficiency.

Means for Solving the Problem

A headlight module according to an aspect of the present disclosure includes a light source to emit light; and a light guide projection optical element including an incidence surface to condense the light, thereby forming a first light, a first reflecting surface to reflect partial light as part of the first light, thereby forming light in a first light distribution pattern having a cutoff line from light other than the partial light, and a second reflecting surface inclined with respect to an optical axis of the light source so as to be farther from the optical axis as a distance from the light source along the optical axis increases, wherein the second reflecting surface forms light in a second light distribution pattern by reflecting second light formed of the partial light reflected by the first reflecting surface and adds the light in the second light distribution pattern to the light in the first light distribution pattern.

Effect of the Invention

According to the present disclosure, a headlight module and a headlight device having high light utilization efficiency can be provided.

MODE FOR CARRYING OUT THE INVENTION

Figure 1:
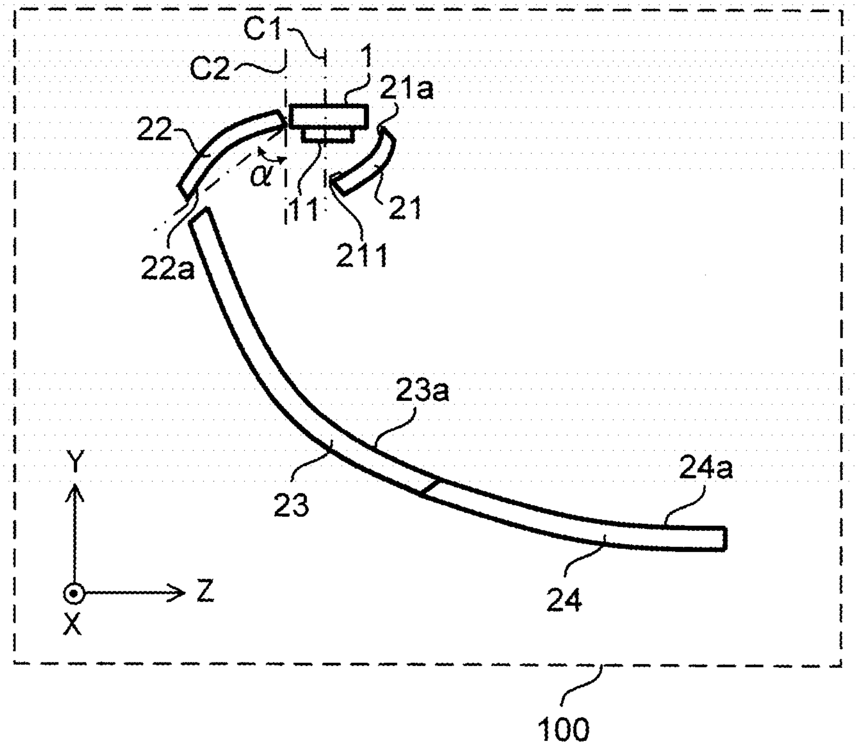
FIG. 1 is a schematic diagram showing a configuration of a headlight module according to a first embodiment.

Headlight modules and headlight devices according to embodiments of the present disclosure will be described below with reference to the drawings. The following embodiments are just examples and a variety of modifications are possible within the scope of the present disclosure. In the drawings, coordinate axes of an XYZ orthogonal coordinate system are shown as needed in order to facilitate the understanding of the description. An X axis is a coordinate axis parallel to a leftward/rightward direction of a vehicle. When facing a forward direction of the vehicle, a rightward direction is a +X axis direction, and a leftward direction is a −X axis direction. Here, the "forward direction" means a traveling direction of the vehicle. In other words, the "forward direction" is a direction in which the headlight device emits light. A Y axis is a coordinate axis parallel to an upward/downward direction of the vehicle. An upward direction of the vehicle is a +Y axis direction, and a downward direction of the vehicle is a −Y axis direction. That is, a +Y axis side of the vehicle is the sky's side, and a −Y axis side of the vehicle is the ground's side (i.e., the road surface's side). A +Z axis direction is the traveling direction of the vehicle, and a −Z axis direction is a direction opposite to the traveling direction. In the following description, the "+Z axis direction" is referred to as the "forward direction", and the −Z axis direction is referred to as a "backward direction". The +Z axis direction is the direction in which the headlight module emits light.

In the following description, a Z-X plane is a surface parallel to the road surface. This is because the road surface when considered normally is a "horizontal surface". Thus, the Z-X plane is regarded as the "horizontal surface". The "horizontal surface" is a plane orthogonal to the gravity direction. However, there are cases where the road surface is inclined with respect to the traveling direction of the vehicle. These cases are cases where the road surface is an upward slope, a downward slope or the like. In these cases, the "horizontal surface" is regarded as a surface parallel to the road surface. That is, the "horizontal surface" is not a plane orthogonal to the gravity direction.

On the other hand, it is rare that an ordinary road surface is inclined in the leftward/rightward direction with respect to the traveling direction of the vehicle. The "leftward/rightward direction" is a width direction of a lane (i.e., the road surface). In such cases, the "horizontal surface" is regarded as a surface orthogonal to the gravity direction. For example, even when the vehicle is orthogonal to the leftward/rightward direction of the road surface due to an inclination of the road surface in the leftward/rightward direction, the condition is considered to be equivalent to a condition in which the vehicle is inclined in the leftward/rightward direction with respect to the "horizontal surface".

To simplify the following description, the description will be given while regarding the "horizontal surface" as a plane orthogonal to the gravity direction. That is, the description will be given while regarding the Z-X plane as a plane orthogonal to the gravity direction.

As the light source in the present disclosure, a tube/bulb light source such as an incandescent lamp, a halogen lamp or a fluorescent lamp may be used, for example. Further, as the light source in the present disclosure, a semiconductor light source such as a light-emitting diode (hereinafter referred to also as an LED (Light Emitting Diode)) or a laser diode may be used, for example. That is, the light source in the present disclosure is not particularly limited and any type of light source may be used.

However, from the viewpoint of lightening the load on the environment such as reducing carbon dioxide ($CO_2$) emission and fuel consumption, it is desirable to employ a semiconductor light source as the light source of the headlight device. The semiconductor light source has higher luminous efficiency compared to the conventional halogen lamps (lamp light sources).

Further, also from the viewpoints of downsizing and weight reduction, employing the semiconductor light source is desirable. The semiconductor light source has higher directivity compared to the conventional halogen bulbs (lamp light sources) and enables downsizing and weight reduction of the optical system.

Therefore, the following description in the present disclosure will be given on the assumption that the light source is the semiconductor light source (specifically, an LED).

The "light distribution pattern" means the shape of a light flux and light intensity distribution resulting from the direction of light emitted from the light source. The "light distribution pattern" will be used also in the meaning of an illuminance pattern on an illuminated surface (e.g., illuminated surface 9 shown in FIGS. 4 to 6) explained later. Further, "lighting distribution" is distribution of the intensity of light with respect to the direction of the light emitted from the light source. In the following description, the "lighting distribution" will be used also in the meaning of illuminance distribution on the illuminated surface 9 shown in FIGS. 4 to 6 which will be explained later.

The headlight module in the present disclosure is employed for the low beam, the high beam, etc. of the headlight device for a vehicle. Further, the headlight module in the present disclosure is employed also for the low beam, the high beam, etc. of the headlight device for a motorcycle. Furthermore, the headlight module in the present disclosure is employed also for the low beam, the high beam, etc. of the headlight device for a different type of vehicle such as a three-wheeled or four-wheeled vehicle.

The following description will be given by taking examples of cases of forming the light distribution pattern of the low beam of the headlight for a motorcycle. In the light distribution pattern of the low beam of the headlight for a motorcycle, the cutoff line is a horizontal straight line extending in the leftward/rightward direction of the vehicle (i.e., the X axis direction). Further, the region below the cutoff line (i.e., inside the light distribution pattern) is the brightest.

As the three-wheeled vehicle, a motor tricycle called a Gyro can be taken as an example. The "motor tricycle called a Gyro" is a scooter with three wheels including one front wheel and uniaxial two rear wheels. In Japan, the motor tricycle called a Gyro is categorized under motorized bicycles. The motor tricycle has a rotation axis in the vicinity of the center of the vehicle body and most of the vehicle body including the front wheel and the driver seat can be tilted in the leftward/rightward direction. With this mechanism, similarly to the motorcycle, the motor tricycle is capable of shifting its barycenter inward at times of turning.

First Embodiment

FIG. 1 is a schematic diagram showing a configuration of a headlight module 100 according to a first embodiment. FIG. 1 is a diagram of the headlight module 100 as viewed from the rightward direction (+X axis direction).

As shown in FIG. 1, the headlight module 100 includes a light source 1, a first reflector 21, a second reflector 22, a third reflector 23 and a fourth reflector 24.

The light source 1 has a light-emitting surface 11. The light source 1 emits light for illuminating a region in the forward direction from the vehicle, from the light-emitting surface 11.

In the example shown in FIG. 1, the light source 1 emits the light in the −Y axis direction. In the following description, the light source 1 employs an LED as a light emission source, for example. The light source 1 is not limited to the LED; a different type of light emission source may be used.

The first reflector 21, the second reflector 22, the third reflector 23 and the fourth reflector 24 are supported by a support member not shown in the figure and included in the headlight module 100.

Figures 2A, 2B, 2C:
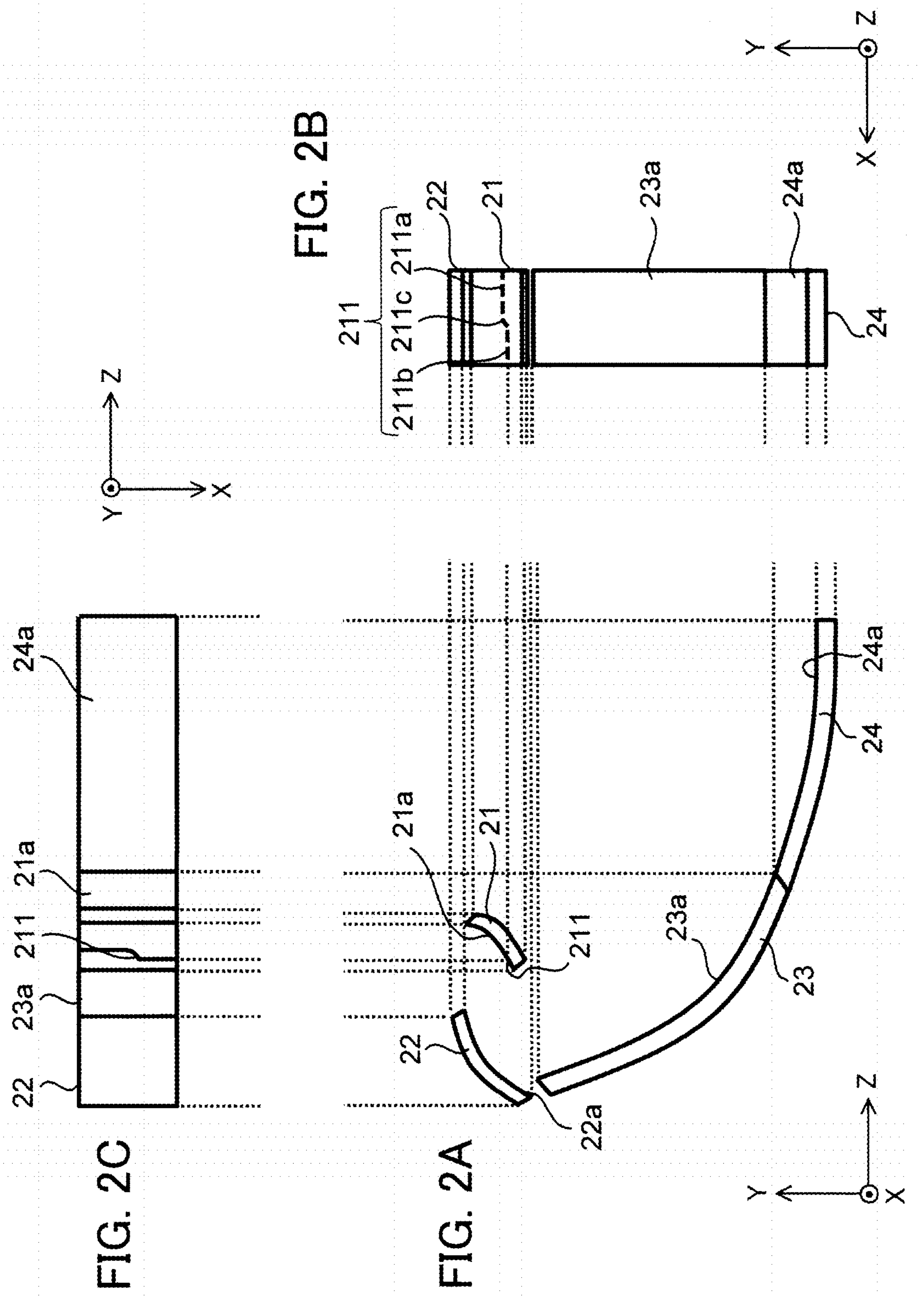
FIGS. 2A to 2C are a side view, a front view and a top view showing a part of the configuration of the headlight module according to the first embodiment.

FIGS. 2A to 2C are a side view, a front view and a top view showing a part of the configuration of the headlight module 100 according to the first embodiment. As shown in FIG. 1 and FIGS. 2A to 2C, the first reflector 21 is provided on the −Y axis side relative to the light source 1. A first reflecting surface 21*a* reflects part of the light emitted from the light source 1 and directs the reflected light towards the second reflector 22. The first reflector 21 has the first reflecting surface 21*a*. The first reflecting surface 21*a* is a mirror surface, for example. The first reflecting surface 21*a* has a curved surface shape for reflecting incident light. On the first reflecting surface 21*a*, a surface (specifically, a Y-Z plane) corresponding to the Y axis direction is in a concave surface shape. In other words, the first reflecting surface 21*a* is formed by a curved surface that is formed with a concave surface facing the light source 1.

The first reflecting surface 21*a* includes a cutoff line formation part 211. The cutoff line formation part 211 does not reflect part of the light emitted from the light source 1. Accordingly, the cutoff line formation part 211 forms light (e.g., light R1*b*, R1*c* shown in FIG. 3 which will be explained later) in a first light distribution pattern (e.g., a basic light distribution pattern PD1 shown in FIG. 4 which will be explained later) having the cutoff line. The cutoff line formation part 211 is formed at an end part of the first reflecting surface 21*a* in the −Y axis direction. The basic light distribution pattern PD1 has a cutoff line 91 (see FIG. 4) corresponding to the shape of the cutoff line formation part 211.

In the first embodiment, the cutoff line formation part 211 has a ridge line in a stepped shape. Specifically, as shown in FIG. 2B, the cutoff line formation part 211 has a stepped shape made up of a first ridge line part 211*a*, a second ridge line part 211*b* and a third ridge line part 211*c*. The second ridge line part 211*b* differs in the position in a direction of an optical axis C1. The third ridge line part 211*c* connects an end part of the first ridge line part 211*a* with an end part of the second ridge line part 211*b* and is inclined with respect to the first ridge line part 211*a* and the second ridge line part 211*b*. By the cutoff line formation part 211 having the stepped shape, light in the basic light distribution pattern PD1 having the cutoff line 91 in the stepped shape is formed. The cutoff line formation part 211 can be implemented even without the ridge line in the stepped shape. Specifically, the cutoff line formation part 211 may have a ridge line in a linear shape parallel to the X axis direction.

The third reflector 23 has a third reflecting surface 23*a*. The third reflecting surface 23*a* is a mirror surface, for example. The third reflecting surface 23*a* has a curved surface shape for reflecting incident light. On the third reflecting surface 23*a*, a surface (specifically, a Y-Z plane) corresponding to the Y axis direction is in a concave surface shape. In other words, the third reflecting surface 23*a* is formed by a curved surface that is formed with a concave surface facing the first reflecting surface 21*a* and a second reflecting surface 22*a*. The third reflecting surface 23*a* has its focal position in the vicinity of the cutoff line formation part 211 as the end part of the first reflecting surface 21*a* in the −Y axis direction. The third reflecting surface 23*a* is arranged at a position that is farther from the light source 1 than the distance between the first reflecting surface 21*a* and the light source 1. The third reflecting surface 23*a* directs light not reflected by the first reflecting surface 21*a*, included in the light emitted from the light source 1, in the forward direction (i.e., the +Z axis direction). The headlight module 100 can be implemented even without the third reflector 23.

The second reflector 22 has the second reflecting surface 22*a*. The second reflector 22 faces the first reflector 21 in the Z axis direction. Therefore, the second reflecting surface 22*a* is arranged to face the first reflecting surface 21*a*. The second reflecting surface 22*a* is a mirror surface, for example. The second reflecting surface 22*a* has a curved surface shape for reflecting incident light. On the second reflecting surface 22*a*, a surface (specifically, a Y-Z plane) corresponding to the Y axis direction is in a concave surface shape. In other words, the second reflecting surface 22*a* is formed by a curved surface that is formed with a concave surface facing the first reflecting surface 21*a*.

In the example shown in FIG. 1, the second reflecting surface 22*a* is arranged to be inclined in the −Z axis direction from the Y axis direction by an angle $\alpha$. In other words, the second reflecting surface 22*a* is inclined so as to be farther from the optical axis C1 of the light source 1 as a distance from the light source 1 along the optical axis C1 increases. Here, the optical axis C1 passes through the center of the light-emitting surface 11 of the light source 1 and is orthogonal to the light-emitting surface 11. The second reflecting surface 22*a* reflects second light (e.g., second light R2 shown in FIG. 3 which will be explained later) formed of the light (e.g., light R1*a* shown in FIG. 3 which will be explained later) reflected by the first reflecting surface 21*a*. Accordingly, the second reflecting surface 22*a* forms light (e.g., light R3 shown in FIG. 3 which will be explained later) in a second light distribution pattern (e.g., additional light distribution pattern PD2 shown in FIG. 5 which will be explained later).

As shown in FIG. 1 and FIGS. 2A to 2C, the fourth reflector 24 is arranged to adjoin the third reflector 23 in the Z axis direction. The fourth reflector 24 has a fourth reflecting surface 24*a*. The fourth reflecting surface 24*a* is a mirror surface, for example. The fourth reflecting surface 24*a* has a curved surface shape for reflecting incident light. On the fourth reflecting surface 24*a*, a surface (specifically, a Y-Z plane) corresponding to the Y axis direction is in a concave surface shape. In other words, the fourth reflecting surface 24*a* is formed by a curved surface that is formed with a concave surface facing the first reflecting surface 21*a* and the second reflecting surface 22*a*. The fourth reflecting surface 24*a* is arranged at a position that is farther from the light source 1 than the distance between the second reflecting surface 22*a* and the light source 1. The fourth reflecting surface 24*a* directs the light reflected by the second reflecting surface 22*a* in the forward direction (i.e., the +Z axis direction). The headlight module 100 can be implemented even without the fourth reflector 24.

Figure 3:
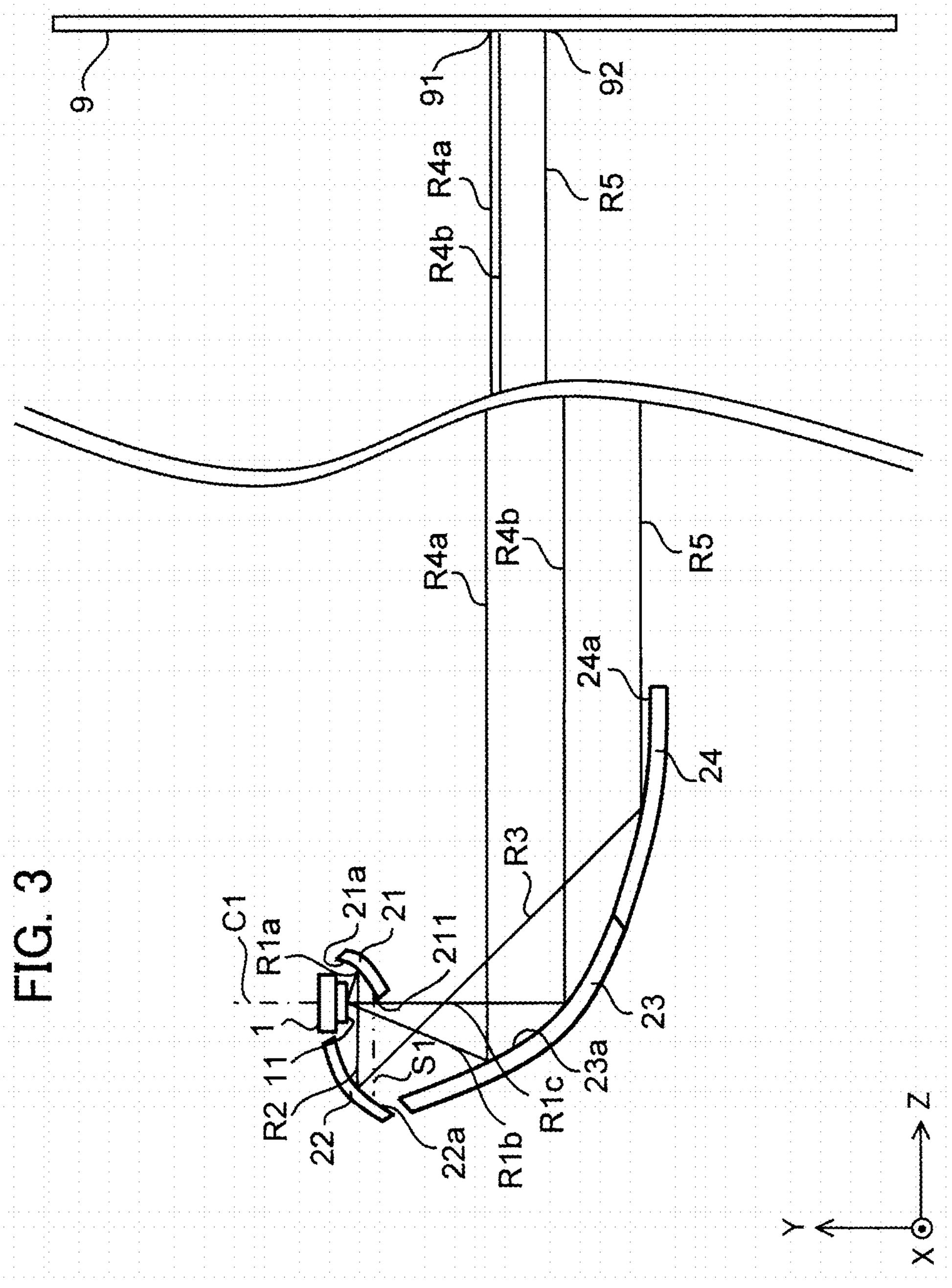
FIG. 3 is a diagram showing optical paths of light emitted from a light source of the headlight module according to the first embodiment.

FIG. 3 is a diagram showing optical paths of the light emitted from the light source 1 of the headlight module 100 according to the first embodiment. In the light emitted from the light source 1, light other than the light R1*a* travels to skirt the vicinity of the cutoff line formation part 211 and is not reflected by the first reflecting surface 21*a*. Accordingly, the light R1*b*, R1*c* in the basic light distribution pattern PD1 is formed. The light R1*b*, R1*c* in the basic light distribution pattern PD1 passes through a plane S1 parallel to the light-emitting surface 11 of the light source 1 (i.e., orthogonal to the optical axis C1) and including the cutoff line formation part 211 and is reflected by the third reflecting surface 23*a*. In the example shown in FIG. 3, the light R1*b*, R1*c* in the basic light distribution pattern PD1 is reflected by the third reflecting surface 23*a* and is applied to an illuminated surface 9 respectively as light R4*a*, R4*b*.

Here, the illuminated surface 9 is in a conjugate relationship with the plane S1 in regard to the Y axis direction. That is, the stepped shape of the cutoff line formation part 211 corresponds to the stepped shape of the cutoff line 91 of the basic light distribution pattern PD1 on the illuminated surface 9. Therefore, a ray R1 that passes through the plane S1 to skirt the cutoff line formation part 211 is applied to a position on the cutoff line 91 on the illuminated surface 9.

Further, the light R1*a* shown in FIG. 3 is reflected by the first reflecting surface 21*a* and travels towards the second reflecting surface 22*a* as the second light R2. The second light R2 is reflected by the second reflecting surface 22*a* and travels towards the fourth reflecting surface 24*a* as the light R3 in the additional light distribution pattern PD2. The light R3 in the additional light distribution pattern PD2 overlaps with the light R1*b*, R1*c* in the basic light distribution pattern PD1. As above, the second reflecting surface 22*a* adds the light R3 in the additional light distribution pattern PD2 to the light R1*b*, R1*c* in the basic light distribution pattern. In the example shown in FIG. 3, the light R3 in the additional light distribution pattern PD2 is reflected by the fourth reflecting surface 24*a* and is applied to the illuminated surface 9 as light R5.

The light R3 in the additional light distribution pattern PD2 is condensed at a position on the plane S1 more separate in the −Z axis direction from the cutoff line formation part 211 compared to the light R1*b*, R1*c* in the basic light distribution pattern PD1. Therefore, the light R5 is applied to a position 92 on the illuminated surface 9 slightly more separate in the −Y axis direction from the cutoff line 91 compared to the light R4*a*, R4*b*.

In the example shown in FIG. 3, a curvature of the fourth reflecting surface 24*a* differs from a curvature of the third reflecting surface 23*a*. Specifically, the curvature of the fourth reflecting surface 24*a* is smaller than the curvature of the third reflecting surface 23*a*. Accordingly, in comparison with a configuration in which the light R3 in the additional light distribution pattern PD2 is reflected by the third reflecting surface 23*a* and is emitted in the forward direction, it is possible in the first embodiment to prevent the light R3 in the additional light distribution pattern PD2 from being applied to a position on the illuminated surface 9 far away from the cutoff line 91 in the −Y axis direction.

Figure 4:
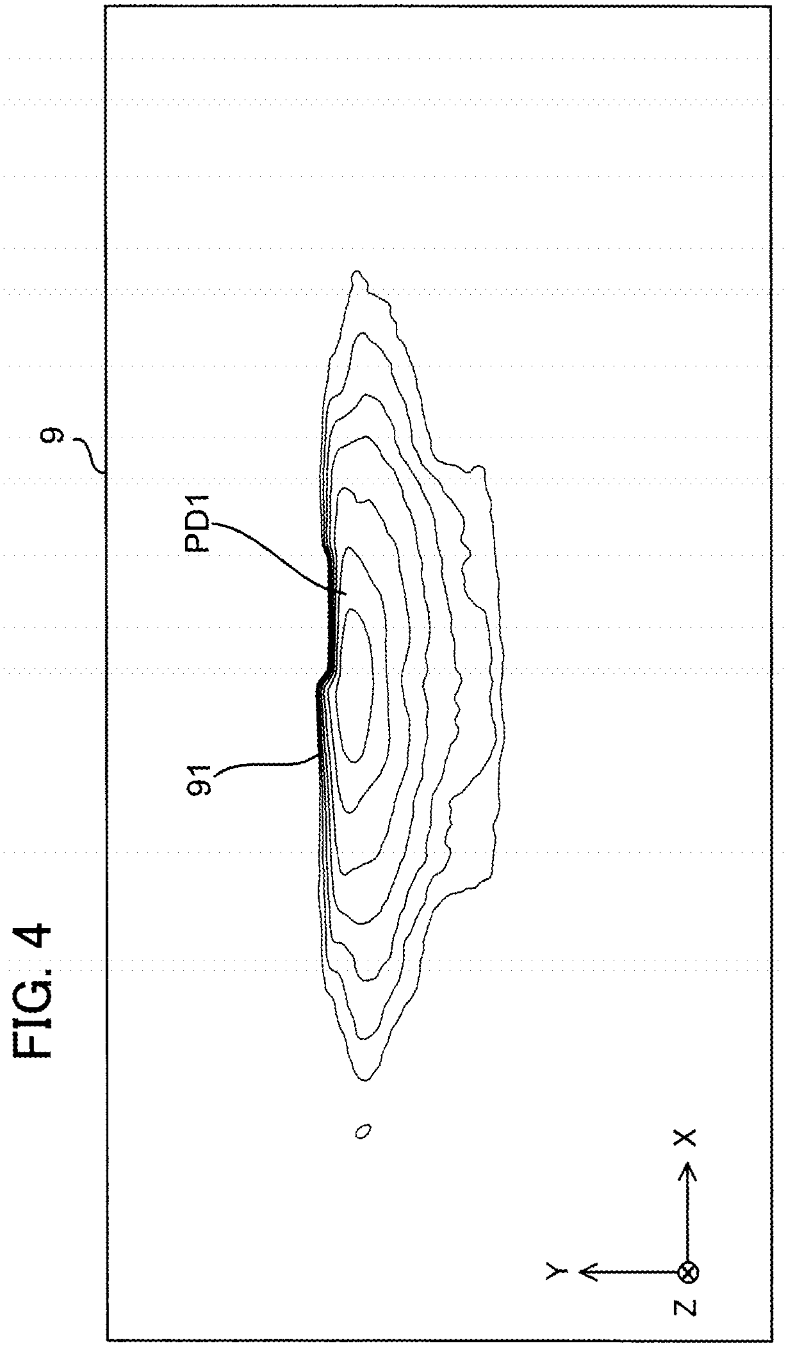
FIG. 4 is a diagram showing an illuminance distribution of a basic light distribution pattern of the headlight module according to the first embodiment in contour display.

FIG. 4 is a diagram showing the illuminance distribution of the basic light distribution pattern PD1 of the headlight module 100 according to the first embodiment in contour display. This illuminance distribution is obtained by simulation. The "contour display" means displaying in a contour drawing. The "contour drawing" means a drawing in which points having the same value are connected by lines. As is clear from FIG. 4, the stepped-shaped cutoff line 91 of the basic light distribution pattern PD1 is projected distinctly.

Figure 5:
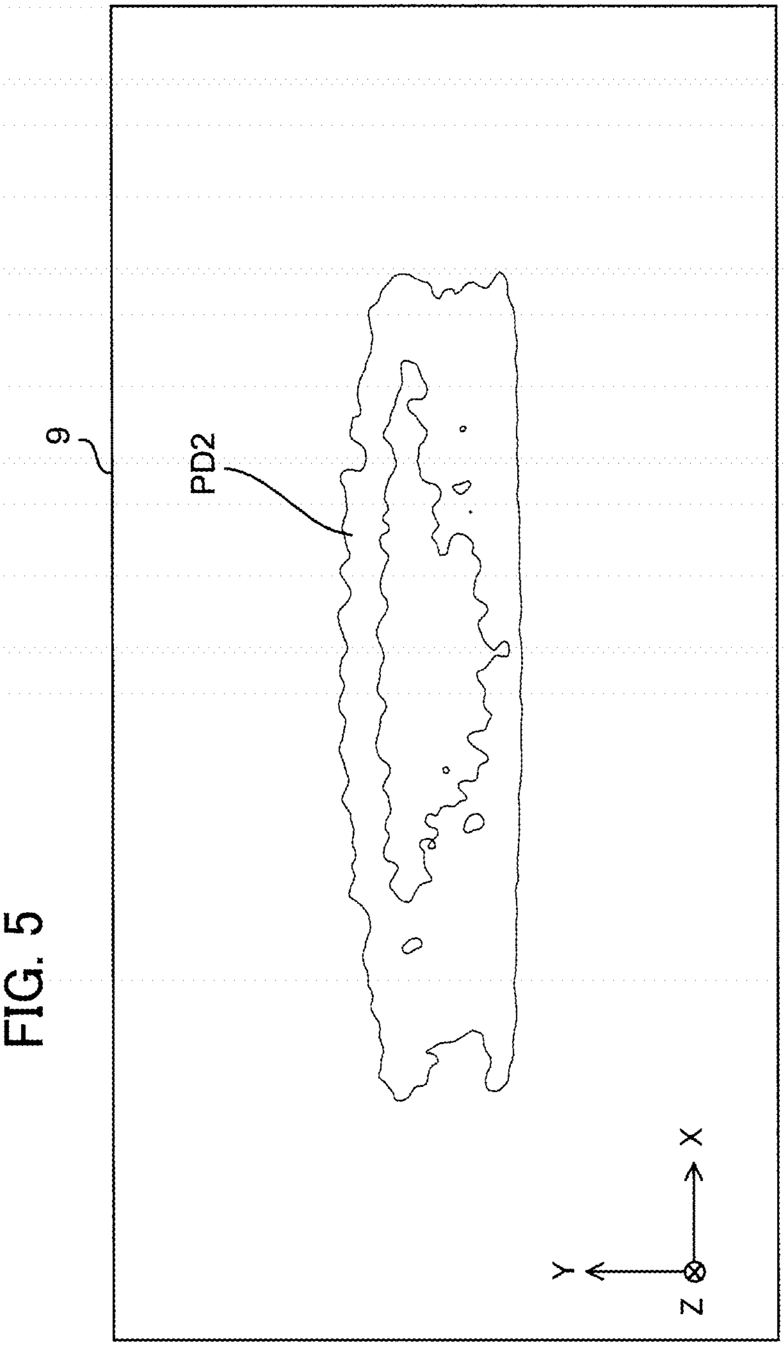
FIG. 5 is a diagram showing an illuminance distribution of an additional light distribution pattern of the headlight module according to the first embodiment in contour display.

FIG. 5 is a diagram showing the illuminance distribution of the additional light distribution pattern PD2 of the headlight module 100 according to the first embodiment in contour display. It is clear from FIG. 4 and FIG. 5 that the additional light distribution pattern PD2 successfully forms a light distribution pattern of a wider range compared to the basic light distribution pattern PD1. Accordingly, in comparison with the configuration using the shade for forming the light in the light distribution pattern having the cutoff line, the light reflected by the first reflecting surface 21*a* in the first embodiment does not result in light loss and is used as the light R3 in the additional light distribution pattern PD2. Therefore, even light not usable before can be used effectively and the headlight module 100 having high light utilization efficiency can be provided. As is seen in FIG. 5, the additional light distribution pattern PD2 has no cutoff line. That is, a boundary line at an end part of the additional light distribution pattern PD2 in regard to the +Y axis direction is unclear.

Figure 6:
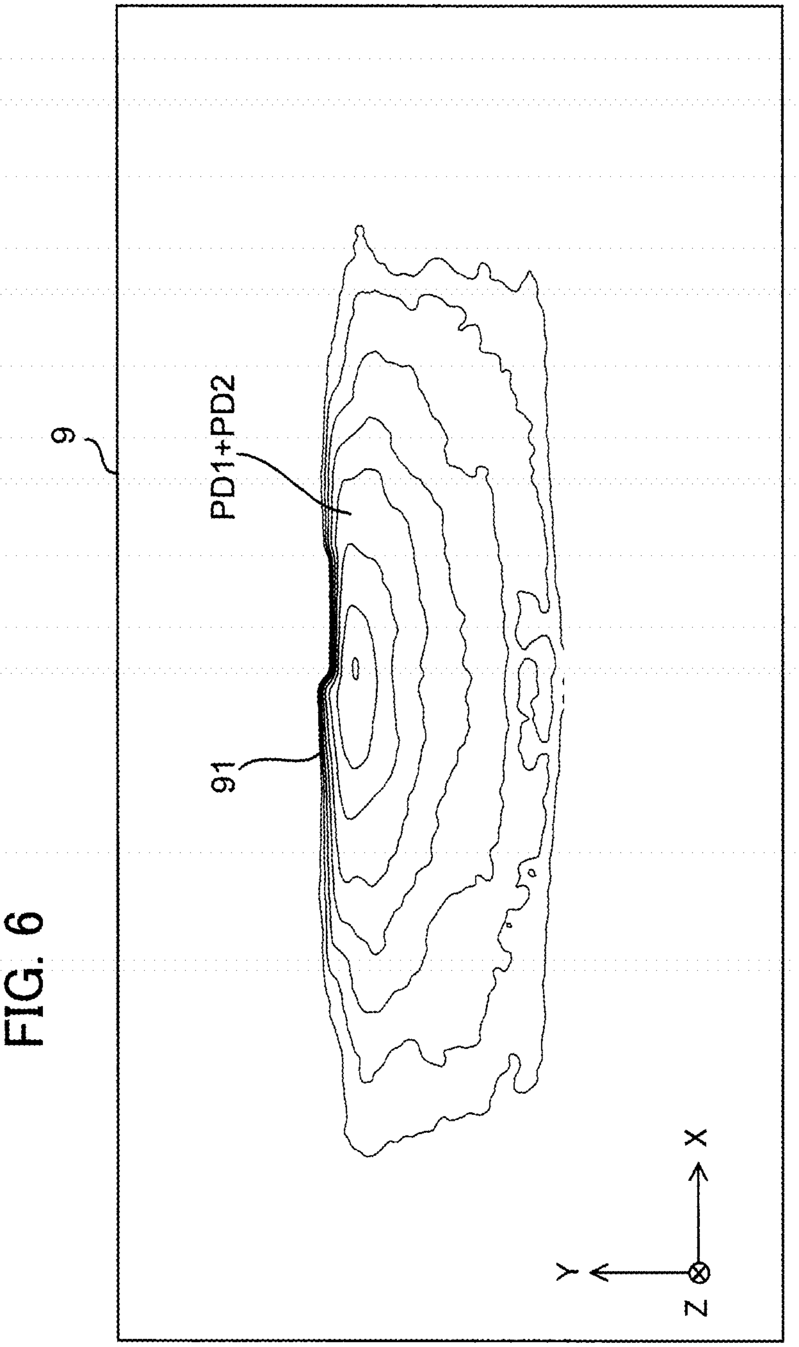
FIG. 6 is a diagram showing an illuminance distribution of a combined light distribution pattern obtained by superimposing the light in the basic light distribution pattern and the light in the additional light distribution pattern of the headlight module according to the first embodiment in contour display.

FIG. 6 is a diagram showing the illuminance distribution of a combined light distribution pattern obtained by superimposing the light in the basic light distribution pattern PD1 and the light in the additional light distribution pattern PD2 of the headlight module 100 according to the first embodiment in contour display. In the combined light distribution pattern shown in FIG. 6, the cutoff line 91 is projected distinctly. Further, by the addition of the light R3 in the additional light distribution pattern PD2 to the light R1*b*, R1*c* in the basic light distribution pattern PD1 (see FIG. 3), the light in the combined light distribution pattern with a wide illumination range is emitted. As is clear also from FIG. 6, in the first embodiment, the second light R2 formed of the light R1*a* reflected by the first reflecting surface 21*a* shown in FIG. 3 is reflected by the second reflecting surface 22*a*, by which the light R1*a* is used as the light R3 in the additional light distribution pattern PD2. That is, the light R1*a* reflected by the first reflecting surface 21*a* can be applied to a valid range as the light R3 in the additional light distribution pattern PD2 as a part of the light distribution pattern of the headlight module 100 for a vehicle.

Effect of First Embodiment

According to the first embodiment described above, the second reflecting surface 22*a* forms the light R3 in the additional light distribution pattern PD2 and adds the light R3 in the additional light distribution pattern PD2 to the light R1*b*, R1*c* in the basic light distribution pattern PD1. Accordingly, in comparison with the configuration using the shade for forming the light in the light distribution pattern having the cutoff line, a part of the light reflected by the first reflecting surface 21*a* does not result in light loss and is used as the light R3 in the additional light distribution pattern PD2. Thus, a headlight module 100 having high light utilization efficiency can be provided.

Further, according to the first embodiment, the first reflecting surface 21*a* includes the cutoff line formation part 211, and the cutoff line formation part 211 has the ridge line in the stepped shape. Accordingly, the cutoff line 91 in the stepped shape required of the low beam for an automobile can be formed.

Furthermore, according to the first embodiment, the curvature of the fourth reflecting surface 24*a* differs from the curvature of the third reflecting surface 23*a*. Accordingly, it is possible to prevent the light R3 in the additional light distribution pattern PD2 from being applied to a position on the illuminated surface 9 far away from the cutoff line 91 in the −Y axis direction.

Second Embodiment

Figure 7:
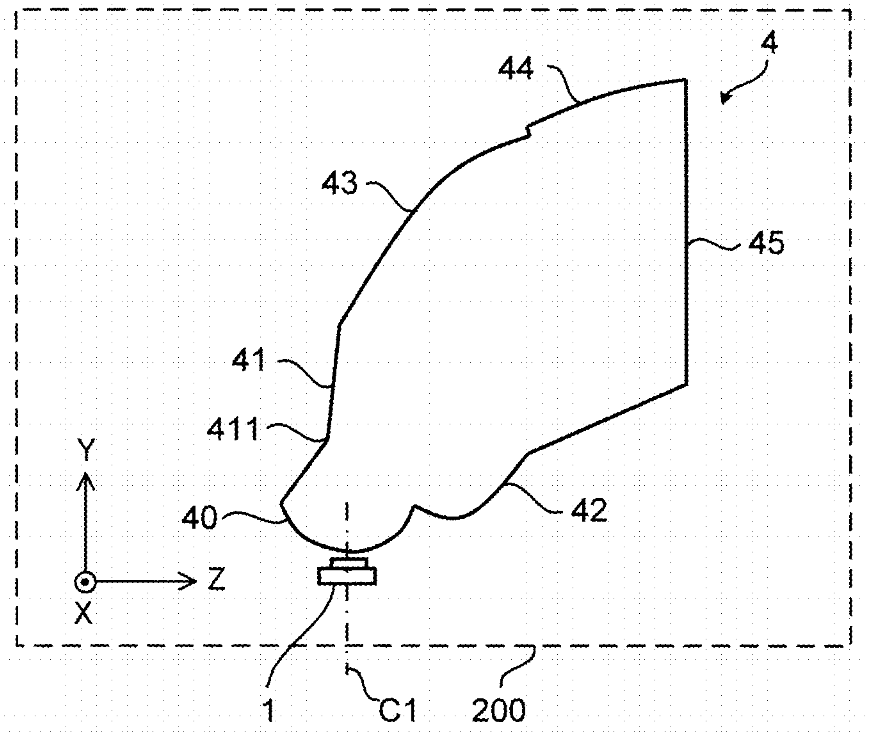
FIG. 7 is a schematic diagram showing a configuration of a headlight module according to a second embodiment.

FIG. 7 is a schematic diagram showing a configuration of a headlight module 200 according to a second embodiment. FIG. 7 is a diagram of the headlight module 200 as viewed from the rightward direction (+X axis direction).

As shown in FIG. 7, the headlight module 200 includes the light source 1 and a light guide projection optical element 4.

The light guide projection optical element 4 is arranged on the +Y axis side relative to the light source 1. Further, the light guide projection optical element 4 is filled in with a refractive material, for example.

Figures 8A, 8B, 8C:
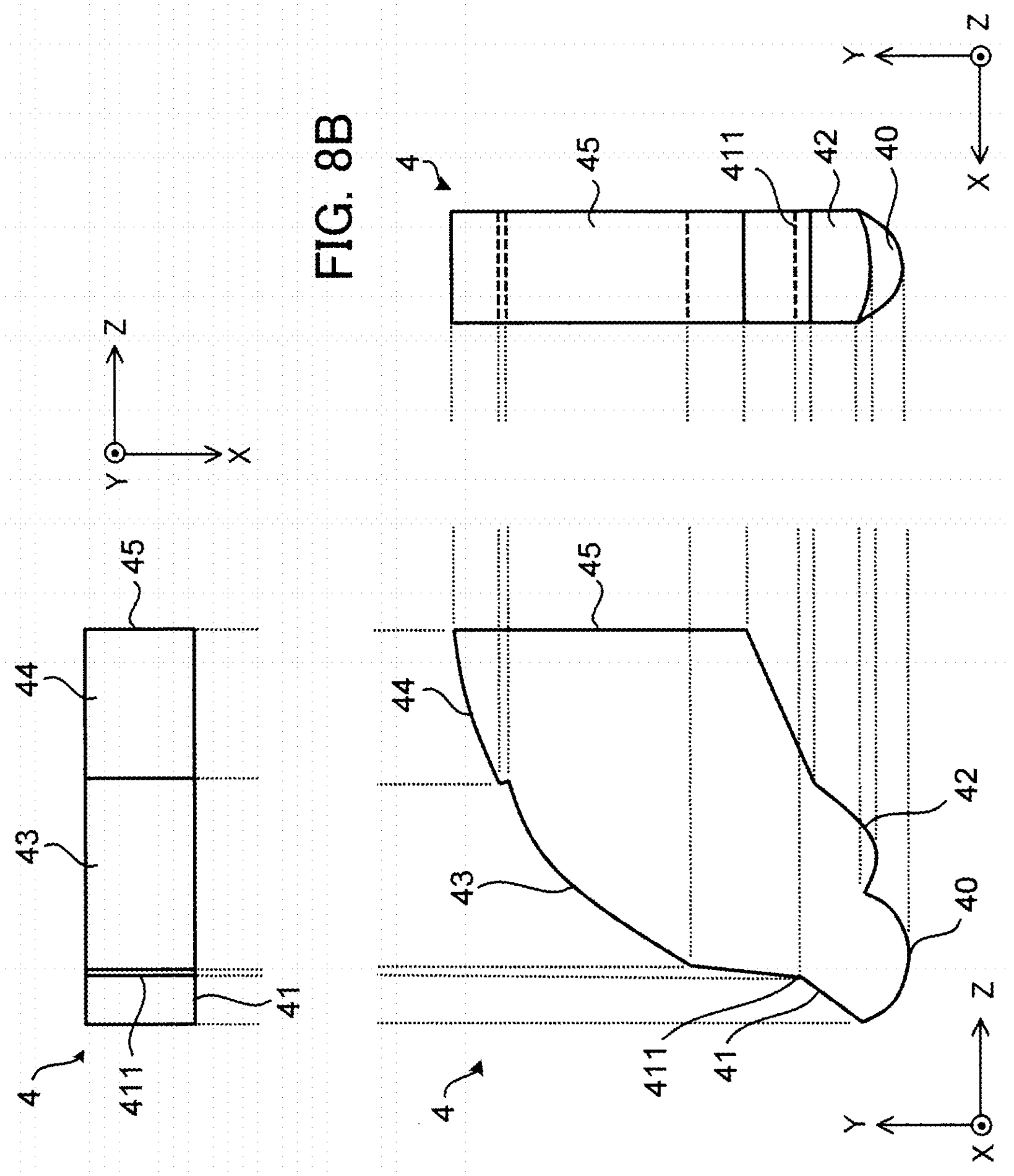
FIGS. 8A to 8C are a side view, a front view and a top view showing the configuration of a light guide projection optical element of the headlight module according to the second embodiment.

FIGS. 8A to 8C are a side view, a front view and a top view showing the configuration of the light guide projection optical element 4. As shown in FIGS. 8A to 8C, the light guide projection optical element 4 includes an incidence surface 40, a first reflecting surface 41, a second reflecting surface 42, a third reflecting surface 43, a fourth reflecting surface 44 and an emission surface 45.

The light emitted from the light source 1 enters the light guide projection optical element 4 through the incidence surface 40 and is condensed at an arbitrary position in the +Y axis direction.

The first reflecting surface 41 reflects part of the light entering the light guide projection optical element 4 through the incidence surface 40. Further, the first reflecting surface 41 forms light R1*b*, R1*c* (see FIG. 9 which will be explained later) in the basic light distribution pattern having the cutoff line by not reflecting part of the light entering through the incidence surface 40.

The first reflecting surface 41 includes a cutoff line formation part 411. The cutoff line formation part 411 has a ridge line in the linear shape (specifically, straight line in the X axis direction). Accordingly, the light R1*b*, R1*c* in the basic light distribution pattern having the cutoff line in the linear shape extending in the X axis direction is formed. The cutoff line formation part 411 may also be configured to have a ridge line in the stepped shape like the cutoff line formation part 211 shown in FIGS. 2B and 2C explained earlier. That is, the basic light distribution pattern in the second embodiment may also be the same as the basic light distribution pattern PD1 shown in FIG. 4 explained earlier.

The third reflecting surface 43 is formed by a curved surface that is formed with a concave surface facing the first reflecting surface 41 and the second reflecting surface 42. The third reflecting surface 43 is arranged at a position that is farther from the light source 1 than the distance between the first reflecting surface 41 and the light source 1. The third reflecting surface 43 directs light not reflected by the first reflecting surface 41, included in the light emitted from the light source 1, towards the emission surface 45. In other words, the third reflecting surface 43 guides the light R1*b*, R1*c* in the basic light distribution pattern towards the emission surface 45. The light guide projection optical element 4 can be implemented even without the third reflecting surface 43.

The second reflecting surface 42 is arranged to face the first reflecting surface 41. The second reflecting surface 42 is formed by a curved surface that is formed with a concave surface facing the first reflecting surface 41. In the example shown in FIG. 7, the second reflecting surface 42 is inclined so as to be farther from the optical axis C1 of the light source 1 as a distance from the light source 1 along the optical axis C1 increases. The second reflecting surface 42 reflects the second light R2 (see FIG. 9 which will be explained later) formed of the light R1*a* (see FIG. 9 which will be explained later) reflected by the first reflecting surface 41. Accordingly, the second reflecting surface 42 forms the light R3 (see FIG. 9 which will be explained later) in the additional light distribution pattern. The additional light distribution pattern in the second embodiment is the same as the additional light distribution pattern PD2 shown in FIG. 5 explained earlier, for example.

The fourth reflecting surface 44 is arranged to adjoin the third reflecting surface 43. The fourth reflecting surface 44 is formed by a curved surface that is formed with a concave surface facing the first reflecting surface 41 and the second reflecting surface 42. The fourth reflecting surface 44 is arranged at a position that is farther from the light source 1 than the distance between the second reflecting surface 42 and the light source 1. The fourth reflecting surface 44 directs the light reflected by the second reflecting surface 42 towards the emission surface 45. In other words, the fourth reflecting surface 44 guides the light R3 in the additional light distribution pattern towards the emission surface 45. The light guide projection optical element 4 can be implemented even without the fourth reflecting surface 44.

Figure 9:
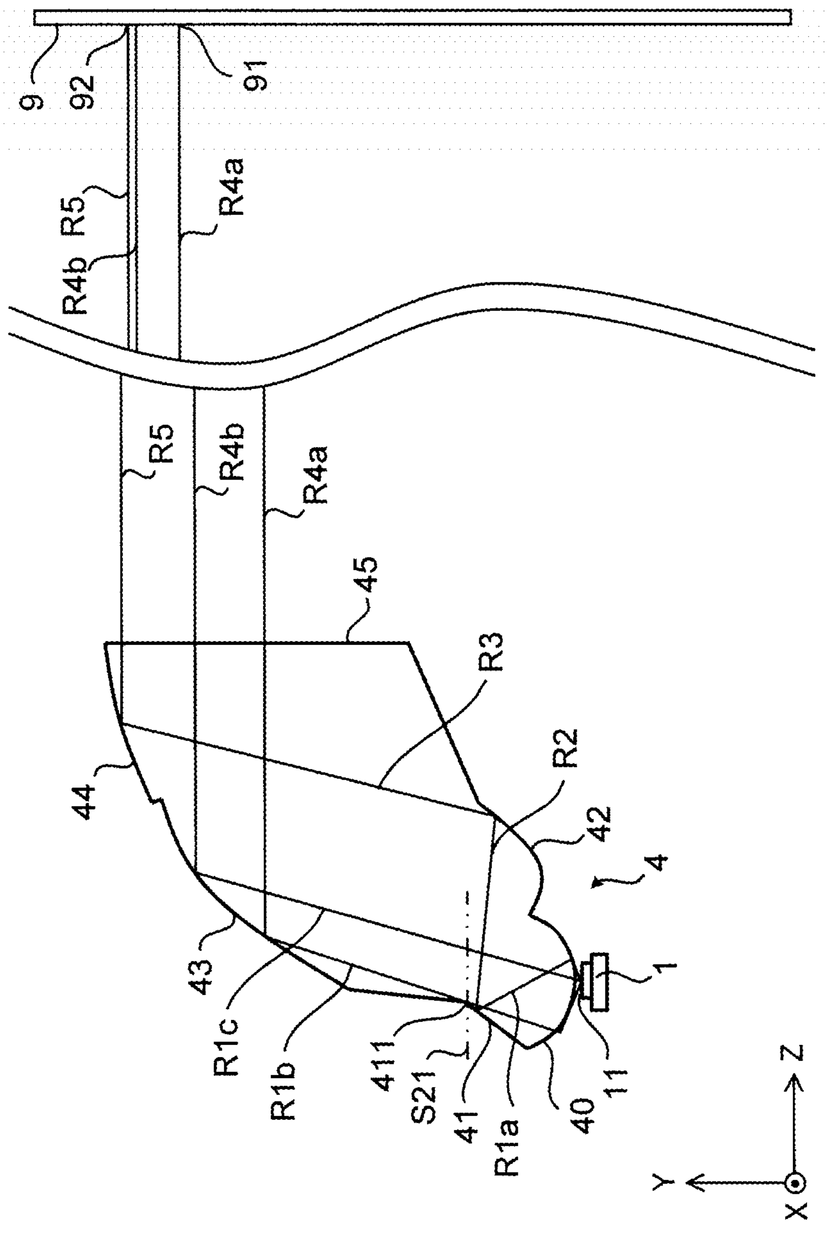
FIG. 9 is a diagram showing optical paths of the light emitted from a light source of the headlight module according to the second embodiment.

FIG. 9 is a diagram showing optical paths of the light emitted from the light source 1 of the headlight module 200 according to the second embodiment. The light emitted from the light source 1 is condensed by the incidence surface 40 at a position in the vicinity of the cutoff line formation part 411. Further, the light R1*a* as a part of the light condensed at the position in the vicinity of the cutoff line formation part 411 is reflected by the first reflecting surface 41.

In the light condensed by the incidence surface 40, light other than the light R1*a* travels in the vicinity of the cutoff line formation part 411 and is not reflected by the first reflecting surface 41. Accordingly, the light R1*b*, R1*c* in the basic light distribution pattern is formed. The light R1*b*, R1*c* in the basic light distribution pattern passes through a plane S21 parallel to the light-emitting surface 11 of the light source 1 (i.e., orthogonal to the optical axis C1) and including the cutoff line formation part 411 and is reflected by the third reflecting surface 43. In the example shown in FIG. 9, the light R1*b*, R1*c* in the basic light distribution pattern is reflected by the third reflecting surface 43 and is applied to the illuminated surface 9 respectively as the light R4*a*, R4*b*.

Here, the illuminated surface 9 is in the conjugate relationship with the plane S21 in regard to the Y axis direction. That is, the shape of the cutoff line formation part 411 corresponds to the shape of the cutoff line 91 of the basic light distribution pattern PD1 on the illuminated surface 9. Therefore, the light R1*b* in the basic light distribution pattern that passes through the plane S21 to skirt the cutoff line formation part 411 is applied to a position on the cutoff line 91 on the illuminated surface 9.

Further, the light R1*c* in the basic light distribution pattern shown in FIG. 9 is condensed at a position on the plane S21 more separate in the +Z axis direction from the cutoff line formation part 411 compared to the light Rib in the basic light distribution pattern. Therefore, also on the illuminated surface 9, the light R1*c* in the basic light distribution pattern is applied to a position more separate in the −Y axis direction from the cutoff line 91 compared to the light R1*b* in the basic light distribution pattern. Thus, the light R4*b* is applied to a position on the illuminated surface 9 slightly more separate in the −Y axis direction from the cutoff line 91 compared to the light R4*a*.

Further, the light R1*a* shown in FIG. 9 is reflected by the first reflecting surface 21*a* and travels towards the second reflecting surface 42 as the second light R2. The second light R2 is reflected by the second reflecting surface 42 and travels towards the fourth reflecting surface 44 as the light R3 in the additional light distribution pattern. The light R3 in the additional light distribution pattern overlaps with the light R1*b*, R1*c* in the basic light distribution pattern. As above, the second reflecting surface 42 adds the light R3 in the additional light distribution pattern to the light R1*b*, R1*c* in the basic light distribution pattern. Accordingly, in comparison with the configuration using the shade for forming the light in the light distribution pattern having the cutoff line, a part of the light reflected by the first reflecting surface 41 in the second embodiment does not result in light loss and is used as the light R3 in the additional light distribution pattern PD2. Therefore, even light not usable before can be used effectively and the headlight module 200 having high light utilization efficiency can be provided.

In the example shown in FIG. 9, the light R3 in the additional light distribution pattern PD2 is reflected by the fourth reflecting surface 44 and is applied to the illuminated surface 9 as the light R5. The light R3 in the additional light distribution pattern PD2 is condensed at a position on the plane S21 more separate in the +Z axis direction from the cutoff line formation part 411 compared to the light R1*b* in the basic light distribution pattern. Thus, the light R5 is applied to the position 92 on the illuminated surface 9 slightly more separate in the −Y axis direction from the cutoff line 91 compared to the light R4*a*.

In the example shown in FIG. 9, a curvature of the fourth reflecting surface 44 differs from a curvature of the third reflecting surface 43. Specifically, the curvature of the fourth reflecting surface 44 is smaller than the curvature of the third reflecting surface 43. Accordingly, in comparison with the configuration in which the light R3 in the additional light distribution pattern PD2 is reflected by the third reflecting surface 23*a* and is emitted in the forward direction, it is possible in the second embodiment to prevent the light R3 in the additional light distribution pattern PD2 from being applied to a position on the illuminated surface 9 far away from the cutoff line 91 in the +Y axis direction.

Effect of Second Embodiment

According to the second embodiment described above, the second reflecting surface 42 forms the light R3 in the additional light distribution pattern and adds the light R3 in the additional light distribution pattern to the light R1*b*, R1*c* in the basic light distribution pattern. Accordingly, in comparison with the configuration using the shade for forming the light in the light distribution pattern having the cutoff line, the light reflected by the first reflecting surface 41 does not result in light loss and is used as the light R3 in the additional light distribution pattern. Thus, the headlight module 200 having high light utilization efficiency can be provided.

Further, according to the second embodiment, the curvature of the fourth reflecting surface 44 differs from the curvature of the third reflecting surface 43. Accordingly, it is possible to prevent the light R3 in the additional light distribution pattern from being applied to a position on the illuminated surface 9 far away from the cutoff line 91 in the −Y axis direction.

The description of the headlight module 100 according to the first embodiment given earlier and the description of the headlight module 200 according to the second embodiment have been given of examples of application to the low beam of a headlight device for an automobile. However, the headlight module in the present disclosure may also be employed for purposes other than the low beam of a headlight device for an automobile. For example, the headlight module 100, 200 can be employed for other purposes such as the low beam and the high beam of headlight devices for motorcycles and motor tricycles.

There are vehicles on which a plurality of headlight modules are arranged to form a light distribution pattern by adding light distribution patterns of the modules together. That is, there are cases where a plurality of headlight modules are arranged and a light distribution pattern is formed by adding light distribution patterns of the modules together. A concrete example of such a mode will be described below in the following third embodiment.

Third Embodiment

Figure 10:
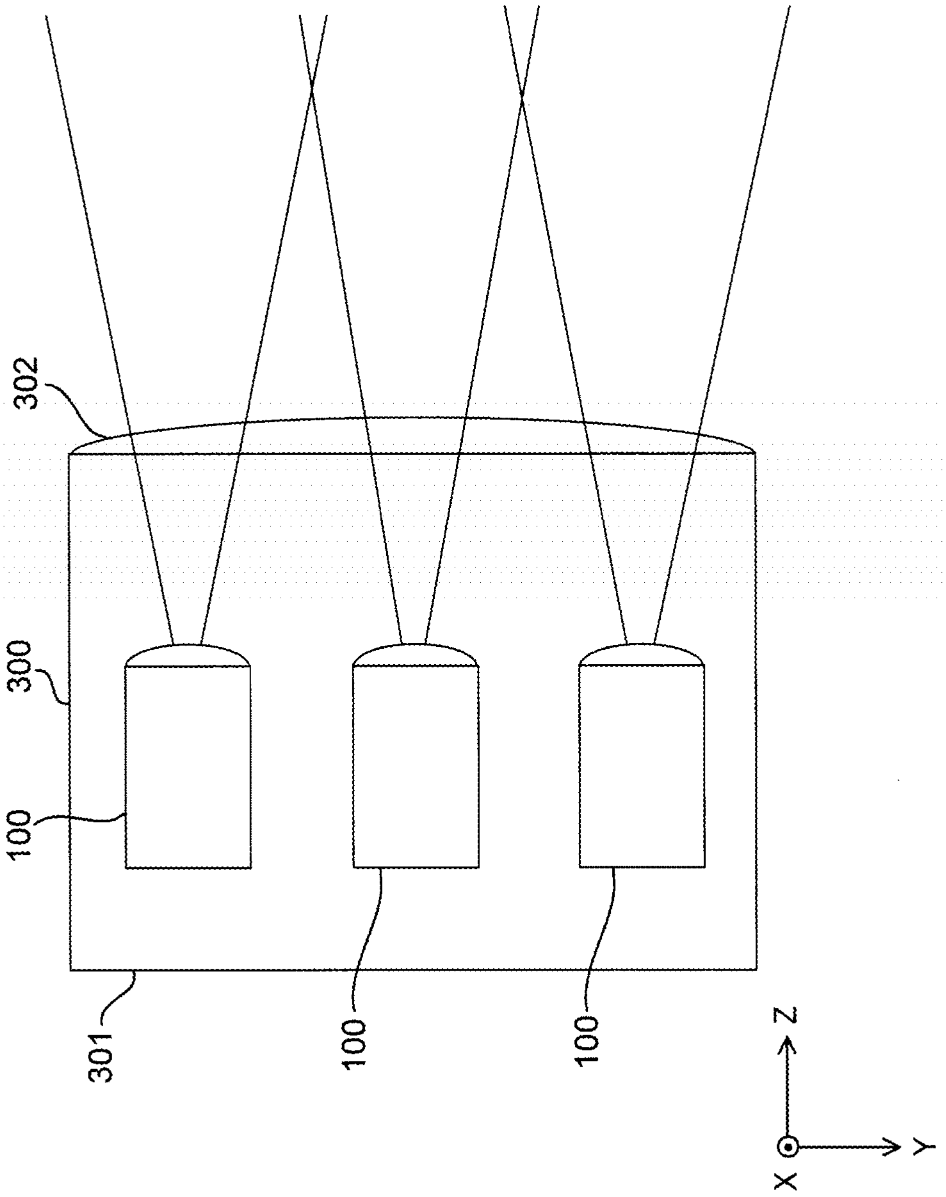
FIG. 10 is a top view schematically showing a configuration example of a headlight device according to a third embodiment.

In the third embodiment, a headlight device 300 employing the headlight modules 100 according to the first embodiment will be described. FIG. 10 is a top view schematically showing a configuration example of the headlight device 300 according to the third embodiment.

The headlight device 300 includes a housing 301 and a cover 302. The cover 302 is made with a transparent material. The housing 301 is attached to the inside of a vehicle body of a vehicle. The cover 302 is arranged at a superficial part of the vehicle body and is exposed to the outside of the vehicle body. The cover 302 is arranged on the +Z axis direction side (i.e., the forward direction side) of the housing 301. The cover 302 is an outer lens, for example.

One or more headlight modules 100 are accommodated in the housing 301. In FIG. 10, three headlight modules 100 are accommodated in the housing 301. As mentioned earlier, the light utilization efficiency is high in the headlight module 100. Therefore, by accommodating one or more headlight modules 100 in the housing 301, a headlight device 300 having high light utilization efficiency can be provided. However, the number of the headlight modules 100 is not limited to three. The number of the headlight modules 100 can also be one, two, or four or more. A plurality of headlight modules 100 are aligned in the X axis direction inside the housing 301. The way of aligning the plurality of headlight modules 100 is not limited to the alignment in the X axis direction. The plurality of headlight modules 100 may also be aligned in a different direction such as the Y axis direction or the Z axis direction in consideration of design, functionality or the like.

Light emitted from the plurality of headlight modules 100 passes through the cover 302 and is emitted in the forward direction from the vehicle. In the example shown in FIG. 10, illuminating light emitted from the cover 302 overlaps with light beams emitted from adjoining headlight modules 100 to form one light distribution pattern.

The cover 302 is provided in order to protect the headlight modules 100 from wind, rain, dust and the like. However, it is unnecessary to provide the cover 302 in cases where each headlight module 100 has a configuration in which the light guide projection optical element 4 protects the components in the headlight module 100 from wind, rain, dust and the like. In FIG. 10, the headlight modules 100 are accommodated in the housing 301. However, the housing 301 does not need to be box-shaped. It is also possible to form the housing 301 with a frame or the like and employ a configuration in which the headlight modules 100 are fixed to the frame.

As described above, the headlight device 300 including a plurality of headlight modules 100 is an aggregate of the headlight modules 100. In cases where the headlight device 300 includes one headlight module 100, the headlight device 300 is the same as the headlight module 100. The headlight device 300 according to the third embodiment may also be configured to include the headlight modules 200 according to the second embodiment.

Incidentally, terms indicating a positional relationship between components or the shape of a component, such as "parallel" and "orthogonal", may have been used in the above embodiments. These terms are intended to include a range allowing for tolerances in the manufacture, variations in the assembly, or the like. Therefore, when a description indicating a positional relationship between components or the shape of a component is included in the claims, such a description is intended to include a range allowing for tolerances in the manufacture, variations in the assembly, or the like.

The embodiments described above are just examples and a variety of modifications are possible within the scope of the present disclosure.

DESCRIPTION OF REFERENCE CHARACTERS

1: light source, 4: light guide projection optical element, 21*a*, 41: first reflecting surface, 22*a*, 42: second reflecting surface, 23*a*, 43: third reflecting surface, 24*a*, 44: fourth reflecting surface, 91: cutoff line, 100, 200: headlight module, 211, 411: cutoff line formation part, 300: headlight device, C1: optical axis, PD1: basic light distribution pattern, PD2: additional light distribution pattern, R1*a*: light, R1*b*, R1*c*: light in basic light distribution pattern, R2: second light, R3: light in additional light distribution pattern.

What is claimed is:

1. A headlight module comprising:
a light source to emit light; and
a light guide projection optical element including
an incidence surface to condense the light, thereby forming a first light,
a first reflecting surface to reflect partial light as part of the first light, thereby forming light in a first light distribution pattern having a cutoff line from light other than the partial light, and
a second reflecting surface inclined with respect to an optical axis of the light source so as to be farther from the optical axis as a distance from the light source along the optical axis increases,
wherein the second reflecting surface forms light in a second light distribution pattern by reflecting second light formed of the partial light reflected by the first reflecting surface and adds the light in the second light distribution pattern to the light in the first light distribution pattern,
the first reflecting surface includes a cutoff line formation part that forms the cutoff line by not reflecting the light other than the partial light, and
the partial light is reflected at a position on the first reflecting surface different from the cutoff line formation part.

2. The headlight module according to claim 1, wherein the second reflecting surface is arranged to face the first reflecting surface.

3. A headlight device comprising one or more headlight modules according to claim 2.

4. The headlight module according to claim 1, wherein the second light distribution pattern does not have the cutoff line.

5. A headlight device comprising one or more headlight modules according to claim 4.

6. A headlight device comprising one or more headlight modules according to claim 1.

7. The headlight module according to claim 1, wherein the light guide projection optical element further includes a third reflecting surface having a focal position thereof in a vicinity of the cutoff line formation part to reflect the light in the first light distribution pattern.

8. The headlight module according to claim 7, wherein the light guide projection optical element further includes a fourth reflecting surface to reflect the light in the second light distribution pattern.

9. A headlight device comprising one or more headlight modules according to claim 7.

10. The headlight module according to claim 8, wherein the third reflecting surface and the fourth reflecting surface are formed by curved surfaces that are formed with concave surfaces facing the first reflecting surface and the second reflecting surface respectively.

11. A headlight device comprising one or more headlight modules according to claim 8.

12. The headlight module according to claim 10, wherein a curvature of the fourth reflecting surface differs from a curvature of the third reflecting surface.

13. A headlight device comprising one or more headlight modules according to claim 10.

14. The headlight module according to claim 12, wherein the curvature of the fourth reflecting surface is smaller than the curvature of the third reflecting surface.

15. A headlight device comprising one or more headlight modules according to claim 12.

16. A headlight device comprising one or more headlight modules according to claim 14.

* * * * *